Figure 1:
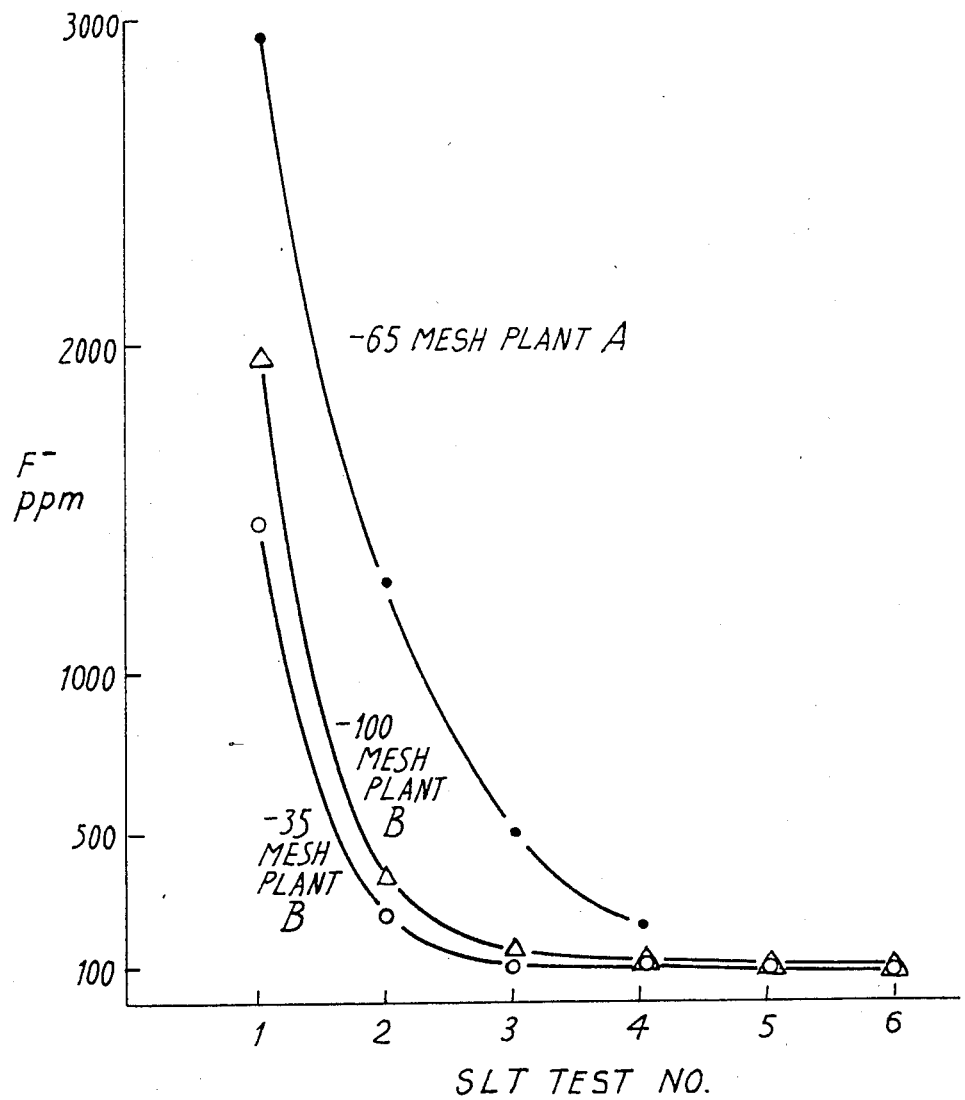

United States Patent [19]

Deutschman

[11] Patent Number: 4,576,651

[45] Date of Patent: Mar. 18, 1986

[54] TREATMENT OF SCRAP LINING MATERIAL FROM ALUMINIUM REDUCTION CELLS

[75] Inventor: John E. Deutschman, Kingston, Canada

[73] Assignee: Alcan International Limited, Montreal, Canada

[21] Appl. No.: 584,534

[22] Filed: Feb. 28, 1984

[30] Foreign Application Priority Data

Mar. 1, 1983 [GB] United Kingdom ............... 8305583

[51] Int. Cl.$^4$ ........................... B08B 3/08; B08B 7/04
[52] U.S. Cl. .................................. 134/25.1; 134/25.5; 134/28; 134/29; 134/30; 423/111
[58] Field of Search ................... 134/25.1, 25.5, 28, 134/29, 30; 427/212, 215, 216; 428/403; 423/111

[56] References Cited

U.S. PATENT DOCUMENTS

| | | | |
|---|---|---|---|
| 4,113,832 | 9/1978 | Bell et al. | 423/111 X |
| 4,158,701 | 6/1979 | Andersen et al. | 423/111 X |
| 4,160,808 | 7/1979 | Andersen et al. | 423/111 X |
| 4,160,809 | 7/1979 | Andersen et al. | 423/111 X |
| 4,444,740 | 4/1984 | Snodgrass et al. | 423/111 X |

OTHER PUBLICATIONS

*Light Metals*, 1981, "Recovery of Fluoride and Fluorine Balance of Aluminum Smelting Plant", Mizuno et al., pp. 407–419.

*Primary Examiner*—Marc L. Caroff
*Attorney, Agent, or Firm*—Cooper, Dunham, Clark, Griffin & Moran

[57] ABSTRACT

A process for treating fluoride-contaminated scrap lining material from electrolytic reduction cells comprises mixing the material with 7–30 parts of sulphuric acid and sufficient water to bring liquid content to 60–80 parts per 100 parts of lining material, mixing in sufficient lime to at least neutralize the sulphuric acid and make the slurry slightly alkaline, the slurry then being allowed to set into a solid mass.

The slurry should be of a paste-like consistency. The lime may be wholly calcium hydroxide, but a substantial proportion may be in the form of calcium carbonate.

The scrap, before or after the above treatment with lime and sulphuric acid, is preferably heated to 150°–500° C. in the presence of water vapor to destroy cyanides.

8 Claims, 5 Drawing Figures

TREATMENT OF SCRAP LINING MATERIAL FROM ALUMINIUM REDUCTION CELLS

The present invention relates to the treatment of scrap lining material from electrolytic reduction cells for the production of aluminium by electrolysis of alumina in a molten fluoride electrolyte. At the end of its useful service life lining material which comprises a large proportion of inert carbon, is heavily contaminated by products which are water-leachable and which would provide unacceptably high contamination of ground water if the scrap lining material was dumped without prior treatment. Very many treatments have been suggested for processing scrap linings. Some treatments are directed to the recovery of fluorine values for recharging to the manufacturing process, while others are primarily concerned with the treatment of the scrap lining materials to render them inoffensive as a source of contamination. The treatment, with which the present invention is concerned, falls into the second category.

One simple procedure which has been suggested for the treatment of the scrap lining material is a prolonged water leaching of the material to leave an inert residue. We find that when the water-leached residues are subjected to standard water-leach tests, designed to simulate the level of contamination of ground waters which might come into contact with dumped treated residues, the concentration of $F^-$ in the water in the test is unacceptably high.

Another objection to the water-leach treatment of scrap cell lining material is that it gives rise to large volumes of contaminated water, which must be treated to reduce contaminant level before discharge into natural water courses.

The same objection applies to any treatment process which results in a body of liquor, separated from the treated residue before dumping.

The present invention is concerned with a treatment of scrap cell lining material in which there is no aqueous residue. Instead it involves the in situ generation of calcium sulphate in the scrap lining material in sufficient quantity to bond the crushed lining material into solid material.

In the process of the invention the scrap lining material is slurried with aqueous sulphuric acid and then lime is added until the mix becomes slightly alkaline (pH about 8-10).

In carrying out the process the lime content may be added in the form of $Ca(OH)_2$, $CaCO_3$ and mixtures of the same. It is generally preferred that at least a substantial proportion of the lime would be in the form of $Ca(OH)_2$, while as large a proportion as possible would be in the form of $CaCO_3$ for economic reasons. After slurrying the mix is allowed to stand until it sets solid. It can then be broken up (if necessary) and dumped.

The treatment with sulphuric acid and lime results in the conversion of most of the fluoride content of the lining to $CaF_2$ but minor residues of solubilisable fluoride remain in the treated lining material. In carrying out the process $CaSO_4$ is precipitated in intimate admixture with the treated lining material, so that under subsequent conditions of leaching the leach water contains a perceptible $Ca^{++}$ ion content, which precipitates dissolved $F^-$ ion as $CaF_2$.

In many instances of existing dumps of spent potlining the $F^-$ ion content of rainwater trickling out of the dump is very high compared with the results that can be achieved by employing the present process. Where local regulations require the highest possible standards of suppression of $F^-$ ion in effluent waters from the storage dump, it is preferred to employ a substantial proportion of $Ca(OH)_2$ in the treatment process. Where the requirements are less critical it is possible to add all the lime in the form of $CaCO_3$ for reasons of economy. It is however preferred that the treated lining should initially contain a proportion of free $Ca(OH)_2$. It is therefore desirable that lime should be added in an amount considerably in excess of the stoichiometric amount required to neutralise all the $H_2SO_4$. It is preferred that the amount of lime added in the form of $Ca(OH)_2$ should be at least half the weight of $H_2SO_4$ added to the potlining. The total weight of lime required (calculated as $Ca(OH)_2$) is commonly about equal to the weight of the sulphuric acid, but additional excess calcium carbonate may be added to improve the stability of the mix to drastic leaching conditions.

Although lime in the form of $Ca(OH)_2$ is preferably added in an amount of at least half the weight of added $H_2SO_4$, $Ca(OH)_2$ may advantageously be added in an amount as little as one fifth of the amount of sulphuric acid with at least sufficient $CaCO_3$ to completely neutralise the sulphuric acid content of the slurry.

The purpose of the present invention is to bind the fluoride-bearing scrap material into a cohesive mass, bonded by means of hydrated calcium sulphate, which also acts as a source of calcium ion to precipitate fluoride ion leached out from the scrap material. In general the calcium sulphate (calculated as $CaSO_4$) should be present in amount of at least 10 parts per hundred parts of scrap material to achieve binding of the base material, while economic considerations (in terms of employment of sulphuric acid) limit the usage of calcium sulphate to about 40 parts per 100 parts of scrap material. Thus sulphuric acid is added to the scrap material in an amount of about 7-30 parts per 100 parts scrap material.

The mix of sulphuric acid, scrap material and lime requires to be of a paste-like consistency to obtain solidification by setting of the in situ-formed calcium sulphate. To obtain a mix of the desired consistency a total liquid content (sulphuric acid and water) of about 60-80 parts (by weight) per 100 parts of waste material is required in most instances, but this may vary considerably, particularly with changes of the porosity of the scrap material under treatment. In most instances it is satisfactory to employ aqueous sulphuric acid containing 40-50% sulphuric acid (by weight) and to add water if necessary to bring the mix to a desired paste-like consistency.

In a generally preferred operation (employing about 20 parts sulphuric acid and 50 parts water per 100 parts lining) $Ca(OH)_2$ is added in amount of at least 10 parts per 100 parts lining, with $CaCO_3$ being added in sufficient amount to bring the total lime addition (calculated as $Ca(OH)_2$ up to at least 20 parts per 100 parts lining. The amount of $CaCO_3$ added is usually at least 15 parts (and more usually 25-35 parts) per 100 parts lining.

Where the lime addition is partially in the form of $CaCO_3$ it is preferred to add most or all of the $CaCO_3$ addition first for reaction with the sulphuric acid, followed by the $Ca(OH)_2$ addition to ensure the presence of some free $Ca(OH)_2$ in the treated material, when first transferred to the waste storage area.

A large excess of lime over $H_2SO_4$ should however be avoided, since it is known that in the NaCaAlF system, the fluoride solubility goes through a minimum value around the neutral point but increases sharply at a very high pH value. It is recommended that during the final addition of Ca(OH)$_2$, tests be run at intervals between successive additions of Ca(OH)$_2$. In this test one part of the product is mixed with 10 parts of water and agitated for 5 minutes. The pH of this slurry should be as high as possible, but the additions of lime should be terminated at about pH 9.0.

A separate treatment for removal of cyanide is frequently desirable and is preferably performed in a manner consistent with the above treatment for fixation of fluorine. That is to say the cyanide removal treatment is preferably performed in such a manner that no aqueous wastes, requiring separate treatments, result.

The following methods have been employed to remove the cyanide as a pre-or post-treatment in conjunction with fluoride fixation:

1. Subjecting the scrap cell lining material to steam at elevated temperature, for example in the range of 150°–500° C. The steam treatment may be effected by soaking the roughly ground scrap lining material to absorb a small proportion of water and then heating the material in an autoclave for a time sufficient to hydrolyse the cyanide content and reduce it to below an acceptable level, such as less than 0.5 ppm., from a typical initial level of 50–100 ppm. The time required to achieve this result is temperature dependent, but the hydrolysis of the cyanide has normally proceeded to 99% completion in 30–120 minutes after the autoclave has been raised to operating temperature.

2. In an alternative treatment the scrap cell lining material may be heated at 150°–500° C. and simultaneously exposed to superheated steam at atmospheric pressure.

3. Heating the mix of scrap material, sulphuric acid, and lime at 150°–500° C. and relying on residual water content to achieve cyanide destruction without using additional steam.

4. Heating the scrap material to a temperature of 150°–500° C. in a stream of gas generated by burning a hydrocarbon fuel and employing the water content to hydrolyse the cyanide content.

In summary the order of preference for the above methods for the destruction of cyanide is as follows:

1. Use of water vapour in the combustion gases.
2. Use of water of crystallisation in the product of treatment for fixation of fluoride.
3. Superheated steam at atmospheric pressure.
4. Autoclave treatment.

For the assessment of the suitability of treated scrap cell lining material for dumping as a landfill without undue hazard a Standard Leach Test ("SLT" Test) has been used. This test is outlined in the United States Environmental Protection Agency document PB299259, EPA-600/2-79-071 of July 1979 entitled "Comparison of three waste leach tests". A finely divided ground sample of the scrap material is tumbled with water for 24 hours at a solids/water ratio of 1:10. It is generally accepted that a level of about 45 ppm F$^-$ or less (and below about 1 ppm cyanide) in the leach water indicates that the material is acceptable for dumping. The test for total release is considered passed if three consecutive tests do not show significant departure from the "base value".

For providing a standard of comparison for assessing the effectiveness of the treatment process of the present invention specimens of untreated scrap cell lining of different particle size and different origin were subjected to repeated S.L.T. tests. The soluble fluorine results are shown in FIG. 1. The total cyanide was 71 ppm in the first S.L.T. test.

It can be seen that the rate of F$^-$ release remained unacceptably high after repetition of the S.L.T. test, indicating that the material could not be considered as satisfactory for dumping as a landfill.

Figure 2:
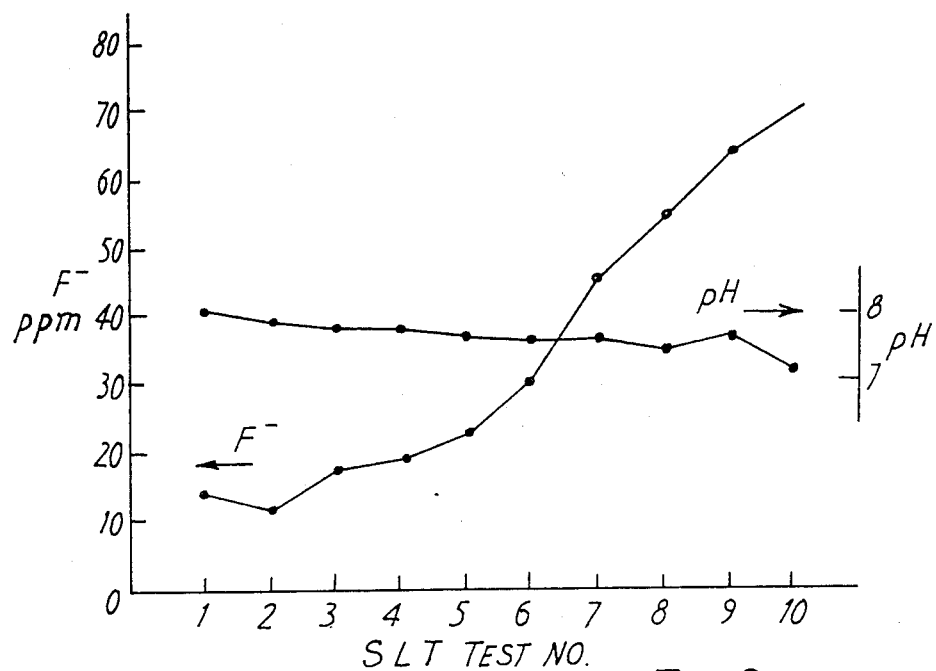
Figure 3:
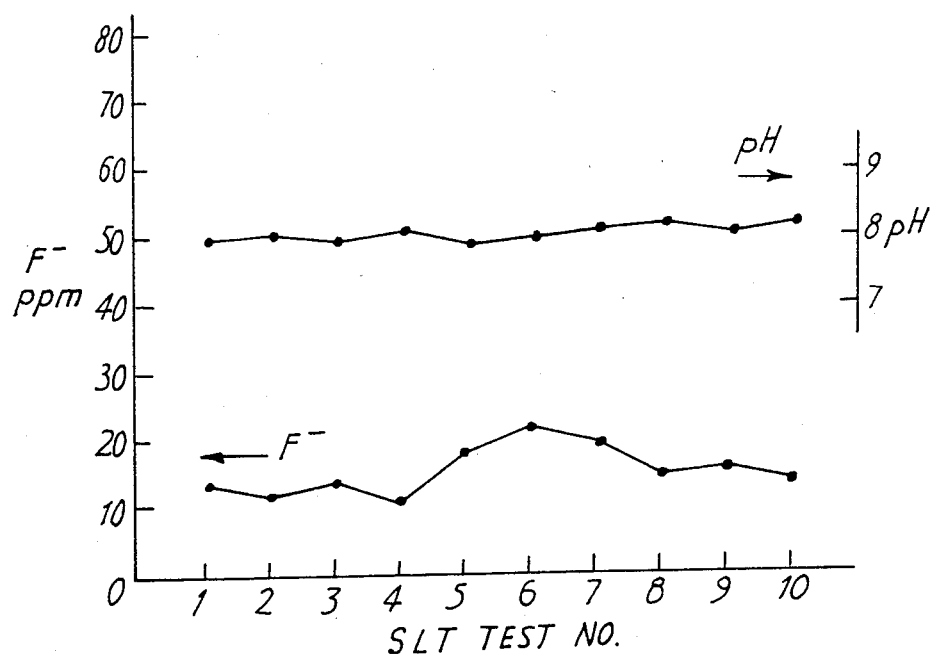

For comparison two specimens, A and B, of the same scrap cell lining material were coarsely crushed to less than 6 mm diameter, heated in a tube-furnace using natural gas, as an initial cyanide destruction treatment and were then treated with 20 parts sulphuric acid and 60 parts water per 100 parts waste material and then with 20 parts Ca(OH)$_2$, (all parts by weight). In case of specimen B, 5 parts of CaCO$_3$ were also added. The material was allowed to set and a specimen was heated for 1 h. at 350° C. for further cyanide removal and then subjected repeatedly to the S.L.T. test. The results for specimens A and B are respectively indicated in FIGS. 2 and 3 which show both the F concentration in the liquor and the pH of the liquor after each test. The total soluble cyanide (free and complexed) remained at <0.10 ppm. for the first three and the tenth S.L.T. test.

It will be seen that after each S.L.T. test the fluoride and cyanide release remained at an acceptable level, indicating that the material treated with the indicated quantities of water, sulphuric acid and lime was suitable for disposal as a landfill.

Moreover, specimen B (FIG. 3) showed a remarkable resistance to extremely drastic conditions (leach with cumulatively 100 parts of water per 1 part of waste, 240 h. of constant agitation).

Figure 4:
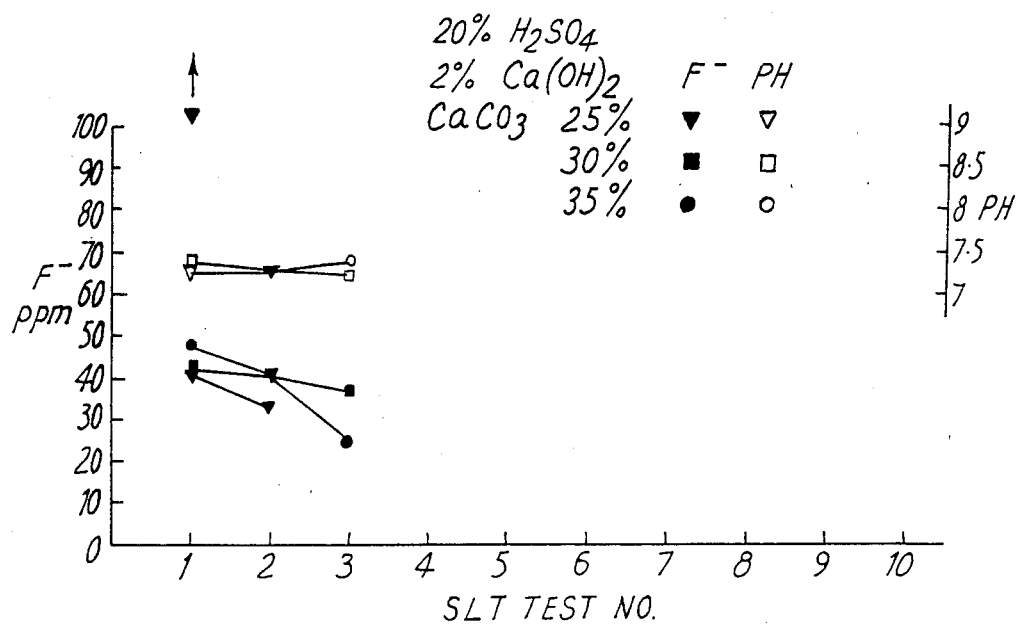
Figure 5:
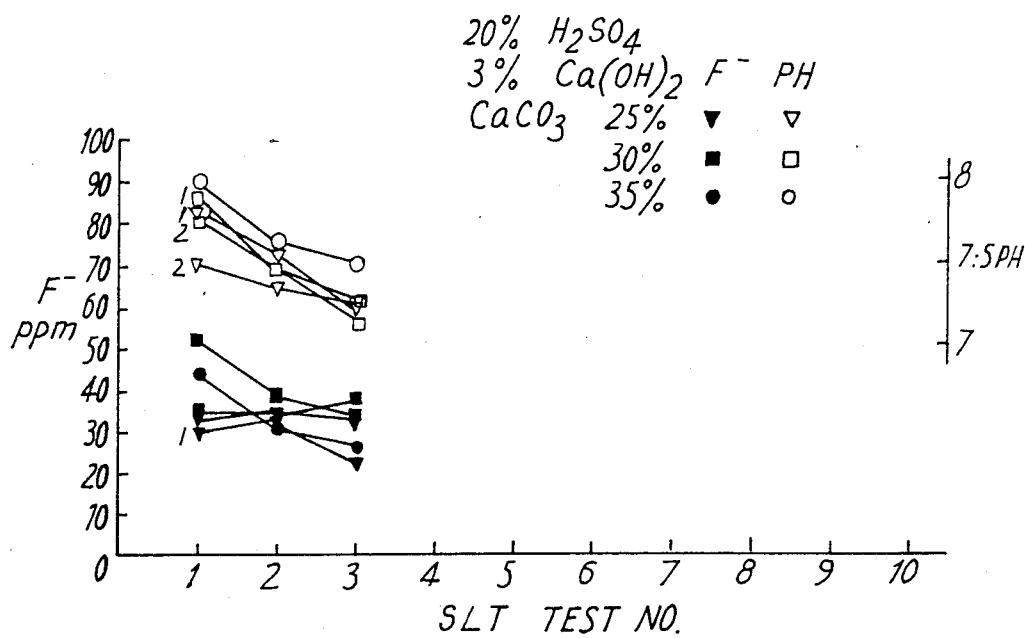

In further tests illustrated in FIGS. 4 and 5, the spent cell lining was slurried with 20 parts H$_2$SO$_4$ and 60 parts water per 100 parts lining, with 2 and 3 parts respectively of calcium hydroxide and calcium carbonate in amounts in the range of 25–35 parts per 100 parts of lining. Although the results are in fact satisfactory, it would seem preferable to employ a rather greater quantity of lime as calcium hydroxide.

In a further test a vertical furnace was loaded with 5 kg. scrap lining from an electrolytic reduction cell. Water vapour was provided by a small steam generator. The <6 mm scrap cell lining consisting of 56% alumina brick, 27% monolithic carbon lining and 17% fines was supported by a fine wire mesh, the bed thickness being 5–8 cm.

The bed temperature was controlled at 375° C. and the retention time at target temperature was 45–50 min. This reduced the cyanide content to below 1 ppm.

After cooling, the scrap material was treated with 1 kg. H$_2$SO$_4$ diluted with 2.5 kg. H$_2$O and then with 0.90 kg. Ca(OH)$_2$ to achieve in the paste a pH of 9.0 by mixing in a cement mixer.

In two tests values of 13.5 ppm and 15.1 ppm soluble F$^-$ and pH of 8.8 were obtained in the leach liquor.

In a further test a 9,000 kg. batch of the spent cell lining was treated with sulphuric acid and calcium hydroxide. It was then exposed, in an impermeable basin, to the natural leaching by rain and melted snow. The local precipitation average is 260 cm/year. The analysis of the collected effluent was as follows:

|  | pH | ppm. F$^-$ |
|---|---|---|
| "S.L.T." Test on untreated cell lining 12-10-83 | 10.8 | Greater than 3000 |

| | pH | ppm. F⁻ |
|---|---|---|
| Collected Effluent 05-01-84 | 8.7 | 20 |
| Collected Effluent 11.01-84 | 8.0 | 22 |
| Collected Effluent 24.01-84 | 8.9 | 27 |

I claim:

1. A process for treating fluoride-contaminated scrap lining material from electrolytic reduction cells which consists essentially of mixing the lining material with at least 7 parts sulphuric acid by weight per 100 parts scrap lining material to produce a slurry, mixing into said slurry an amount of lime in amount at least sufficient to completely neutralise the sulphuric acid, but insufficient to raise pH of said slurry above 10, said slurry having a total liquid content sufficient to bring it to a paste-like consistency, the slurry then being allowed to set into a solid mass bound by hydrated calcium sulphate.

2. A process according to claim 1 in which the total liquid content of the slurry is 60–80 parts (by weight) per 100 parts scrap material.

3. A process according to claim 1 in which sulphuric acid is added in an amount of 7–30 parts by weight per 100 parts scrap material.

4. A process according to claim 1 in which lime is added in the form of calcium hydroxide in an amount of at least 20% by weight of the sulphuric acid, the balance of the lime requirement being added in the form of calcium carbonate.

5. A process according to claim 4 in which the addition of calcium carbonate to the slurry precedes the addition of calcium hydroxide, the total addition of calcium hydroxide and calcium carbonate being in excess of the amount required to completely neutralise the sulphuric acid whereby the neutralised slurry contains free calcium hydroxide.

6. A process according to claim 1 in which the weight of added lime, calculated as $Ca(OH)_2$, is at least equal to the weight of added sulphuric acid.

7. A process for treating scrap lining material from electrolytic reduction cells which material is fluoride-contaminated and also has a cyanide content, which process consists essentially of heating the scrap material to a temperature in the range of 150°–500° C. in the presence of water vapour for hydrolysis of its cyanide content, mixing the lining material with at least 7 parts of sulphuric acid by weight per 100 parts scrap lining material to produce a slurry, mixing into said slurry an amount of lime in amount at least sufficient to completely neutralise the sulphuric acid, but insufficient to raise pH of said slurry above 10, said slurry having a total liquid content sufficient to bring it to a paste-like consistency, the slurry then being allowed to set into a solid mass bound by hydrated calcium sulphate.

8. A process according to claim 7 in which the hydrolysis of cyanide precedes the treatment of the waste material with sulphuric acid and lime.

* * * * *